US010262798B2

(12) United States Patent
Sasaki (10) Patent No.: US 10,262,798 B2
(45) Date of Patent: Apr. 16, 2019

(54) MULTILAYER ELECTRONIC COMPONENT

(71) Applicant: TAIYO YUDEN CO., LTD., Taito-ku, Tokyo (JP)

(72) Inventor: Takashi Sasaki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/523,246

(22) PCT Filed: Sep. 10, 2015

(86) PCT No.: PCT/JP2015/075666
§ 371 (c)(1),
(2) Date: Apr. 28, 2017

(87) PCT Pub. No.: WO2016/067767
PCT Pub. Date: May 6, 2016

(65) Prior Publication Data
US 2017/0323726 A1    Nov. 9, 2017

(30) Foreign Application Priority Data

Oct. 28, 2014  (JP) .................................. 2014-218829

(51) Int. Cl.
*H01G 4/232*    (2006.01)
*H01G 4/30*     (2006.01)
(Continued)

(52) U.S. Cl.
CPC ............... *H01G 4/232* (2013.01); *H01G 2/06* (2013.01); *H01G 4/005* (2013.01); *H01G 4/30* (2013.01)

(58) Field of Classification Search
CPC ........... H01G 4/232; H01G 4/005; H01G 4/30
See application file for complete search history.

(56) References Cited

U.S. PATENT DOCUMENTS

| 9,743,514 B2 * | 8/2017 | Gu ........................ H05K 1/0306 |
| 2001/0019176 A1 * | 9/2001 | Ahiko .................... H01G 4/012 |
| | | 257/777 |

(Continued)

FOREIGN PATENT DOCUMENTS

| JP | S4939942 U | 4/1974 |
| JP | H0757965 A | 3/1995 |

(Continued)

OTHER PUBLICATIONS

International Search Report (ISR), dated Nov. 2, 2015, issued for International application No. PCT/JP2015/075666.

(Continued)

*Primary Examiner* — David M Sinclair
(74) *Attorney, Agent, or Firm* — Law Office of Katsuhiro Arai (57) ABSTRACT

In an embodiment of a multilayer electronic component, one main electrode part 12a of the first external electrode 12 present on one height-direction face of the capacitor body 11 of the multilayer capacitor is partially opposed to the other main electrode part 13a of the second external electrode 13 present on the other height-direction face, while one main electrode part 13a of the second external electrode 13 present on one height-direction face of the capacitor body 11 is partially opposed to the other main electrode part 12a of the first external electrode 12 present on the other height-direction face of the capacitor body 11, and margin areas MR1 to MR4 of roughly belt shape exist between each of the opposing areas OR and each of the edges on both height-direction faces of the capacitor body 11.

4 Claims, 6 Drawing Sheets

(51) Int. Cl.
H01G 2/06 (2006.01)
H01G 4/005 (2006.01)

(56) References Cited

U.S. PATENT DOCUMENTS

| | | | | |
|---|---|---|---|---|
| 2006/0126264 A1* | 6/2006 | Yoshii | .................... | H01G 4/232 |
| | | | | 361/301.1 |
| 2010/0123994 A1* | 5/2010 | Nishisaka | ............... | H01G 4/232 |
| | | | | 361/306.3 |
| 2010/0290173 A1* | 11/2010 | Yoon | ........................ | H01G 2/06 |
| | | | | 361/321.2 |
| 2012/0057268 A1* | 3/2012 | Tsutsumi | ............... | H01G 4/012 |
| | | | | 361/301.4 |
| 2012/0314338 A1* | 12/2012 | Togashi | ................... | H01G 4/30 |
| | | | | 361/306.3 |
| 2013/0120900 A1* | 5/2013 | Chung | ................... | H01G 4/005 |
| | | | | 361/303 |
| 2014/0139970 A1* | 5/2014 | Onuma | ................. | H01G 4/012 |
| | | | | 361/301.4 |

FOREIGN PATENT DOCUMENTS

| | | | |
|---|---|---|---|
| JP | H09219335 A | | 8/1997 |
| JP | 2012009680 A | * | 1/2012 |
| JP | 2014138172 A | | 7/2014 |
| JP | 2015103554 A | * | 6/2015 |
| JP | 2016219624 A | * | 12/2016 |

OTHER PUBLICATIONS

A First Office Action issued by the State Intellectual Property Office of China dated Apr. 13, 2018 for Chinese counterpart application No. 201580050668.X.

* cited by examiner

MULTILAYER ELECTRONIC COMPONENT

This application is the U.S. National Phase under 35 U.S.C. § 371 of International Application PCT/JP2015/075666, filed Sep. 10, 2015, which claims priority to Japanese Patent Application No. 2014-218829, filed Oct. 28, 2014. The International Application was published under PCT Article 21(2) in a language other than English.

TECHNICAL FIELD

The present invention relates to a multilayer electronic component constituted by a component body of multilayer structure that forms a roughly rectangular solid shape specified in terms of length, width, and height, and also by a first external electrode and a second external electrode, each having a different polarity when in use, provided on such component body.

BACKGROUND ART

As an example of the aforementioned multilayer electronic component, a multilayer electronic component requiring no consideration on top/bottom orientation (height-direction orientation) (hereinafter referred to as the "conventional component") is disclosed in Patent Literature 1 specified below. This conventional component has a component body of multilayer structure that forms a roughly rectangular solid shape specified in terms of length, width, and height, wherein, on one height-direction face of the component body, a first external electrode is positioned at one corner, while a second external electrode is positioned at the corner diagonally opposite this corner, and, on the other height-direction face, the first external electrode is positioned at the corner next to the one directly on the reverse side of the one corner mentioned above, while the second external electrode is positioned at the corner diagonally opposite this corner. In other words, the positions of the two external electrodes when the one height-direction face of the multilayer electronic component is facing up, are roughly the same as the positions of the two external electrodes when the other height-direction face of the multilayer electronic component is facing up, so long as the first external electrode and the second external electrode are interchangeable with each other. However, attempts to use this conventional component to meet today's demand for size reduction and thickness reduction, give rise to the concerns discussed below.

To be specific, the conventional component is such that, as is evident from FIGS. 3 and 5 of Patent Literature 1 specified below, the first external electrode positioned on one height-direction face of the component body is partially opposed, via the component body, to the second external electrode positioned on the other height-direction face of the component body, while the second external electrode positioned on one height-direction face of the component body is partially opposed, via the component body, to the first external electrode positioned on the other height-direction face of the component body, and each of these opposed parts reaches the edge of one height-direction face, or the edge of the other height-direction face, of the component body.

This means that, given how each external electrode is produced, both the shortest distance between the opposed part of the first external electrode positioned on one height-direction face of the component body and the opposed part of the second external electrode positioned on the other height-direction face of the component body, and the shortest distance between the opposed part of the second external electrode positioned on one height-direction face of the component body and the opposed part of the first external electrode positioned on the other height-direction of the component body, become equal to or less than the height of the component body. These shortest distances become smaller as the height of the component body decreases as a result of the aforementioned size reduction and thickness reduction. To explain this in a specific example, the shortest distances become 100 µm or less when the height of the component body is 100 µm.

Accordingly, as the height of the component body of the conventional component decreases as a result of the aforementioned size reduction and thickness reduction, and the first external electrode and second external electrode on one height-direction face or the other height-direction face of the component body are mounted using solder on conductor pads on a component mounting board, component incorporating board etc., the chances are high that bridges generated by scattering or wetting of solder when the component is mounted, etc., will cause the opposed part of the first external electrode to become electrically continuous with the opposed part of the second external electrode, and shorting of the first external electrode and the second external electrode will occur as a result. Also, as the height of the component body of the conventional component decreases as a result of the aforementioned size reduction and thickness reduction, and the conventional component is incorporated in a component-incorporating board in such a way that conductor vias are connected to the first external electrode and second external electrode on one height-direction face or the other height-direction face of the component body. Chances are high that, after the component has been incorporated, migration products attributable to moisture in the component sealing resin will cause the opposed part of the first external electrode to become electrically continuous with the opposed part of the second external electrode, and shorting of the first external electrode and the second external electrode will occur as a result.

BACKGROUND ART LITERATURE

Patent Literature

Patent Literature 1: Japanese Patent Laid-open No. 2014-138172

SUMMARY OF THE INVENTION

Problems to be Solved by the Invention

An object of the present invention is to provide a multilayer electronic component that eliminates the need to control its height-direction orientation for use on a component mounting board, component-incorporating board, etc., while preventing shorting between the first external electrode and the second external electrode when the component is mounted or after it has been incorporated.

Means for Solving the Problems

To achieve the aforementioned object, the present invention represents a multilayer electronic component constituted by a component body of multilayer structure that forms a roughly rectangular solid shape specified in terms of length, width, and height, and also by a first external electrode and a second external electrode, each having a different polarity when in use, provided on such component body, wherein: (1) the first external electrode has two main electrode parts that are electrically continuous with each other, where one main electrode part is positioned near a first corner on one height-direction face of the component body, while the other main electrode part is positioned near a third corner on the other height-direction face which in turn is positioned on the reverse side of a second corner next to the first corner on the one height-direction face of the component body; (2) the second external electrode has two main electrode parts that are electrically continuous with each other, where one main electrode part is positioned near a fourth corner which faces the first corner on one height-direction face of the component body, while the other main electrode part is positioned near a sixth corner on the other height-direction face which in turn is positioned on the reverse side of a fifth corner next to the fourth corner on the one height-direction face of the component body; (3) the one main electrode part of the first external electrode present on the one height-direction face of the component body is partially opposed, via the component body, to the other main electrode part of the second external electrode present on the other height-direction face of the component body, where a first margin area exists between the opposing area of the one main electrode part of the first external electrode and the edge connecting the first corner with the fifth corner, while a second margin area exists between the opposing area of the other main electrode part of the second external electrode and the edge connecting the sixth corner with a seventh corner on the other height-direction face positioned on the reverse side of the first corner; and (4) the one main electrode part of the second external electrode present on the one height-direction face of the component body is partially opposed, via the component body, to the other main electrode part of the first external electrode present on the other height-direction face of the component body, where a third margin area exists between the opposing area of the one main electrode part of the second external electrode and the edge connecting the second corner with the fourth corner, while a fourth margin area exists between the opposing area of the other main electrode part of the first external electrode and the edge connecting the third corner with an eighth corner on the other height-direction face positioned on the reverse side of the fourth corner.

Effects of the Invention

According to the present invention, a multilayer electronic component that eliminates the need to control its height-direction orientation for use on a component mounting board, component-incorporating board, etc., while preventing shorting between the first external electrode and the second external electrode when the component is mounted or after it has been incorporated, can be provided.

BRIEF DESCRIPTION OF THE DRAWINGS

FIG. 1 (A) is a view of a multilayer capacitor to which the present invention has been applied, from one height-direction face of its capacitor body, while FIG. 1 (B) is a view of the same multilayer capacitor from the other height-direction face of its capacitor body when the capacitor body is rotated by 180° around line S1-S1 as an axis.

FIG. 2 (A) is a cross sectional view of FIG. 1 (A) along S1-S1, while FIG. 2 (B) is a partially enlarged view of FIG. 2 (A).

FIG. 3 (A) is an enlarged cross sectional view of FIG. 1 (A) along S2-S2, while FIG. 3 (B) is an enlarged cross sectional view of FIG. 1 (A) along S3-S3.

MODE FOR CARRYING OUT THE INVENTION

Figure 1:
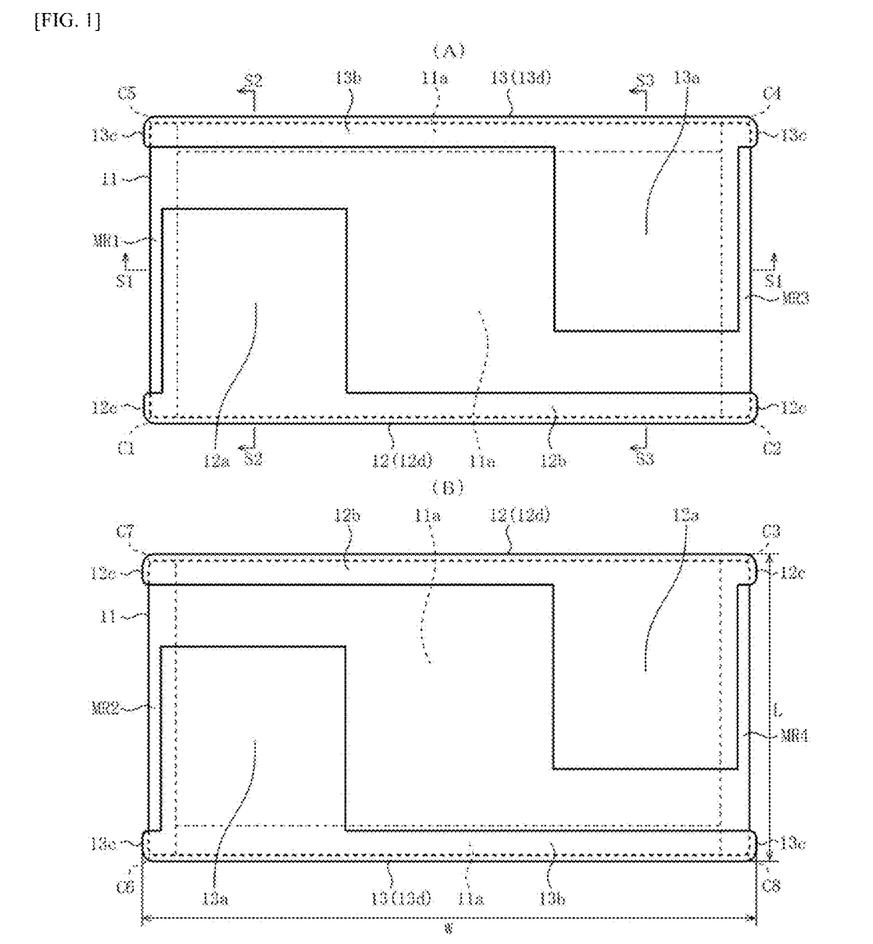
Figure 2:
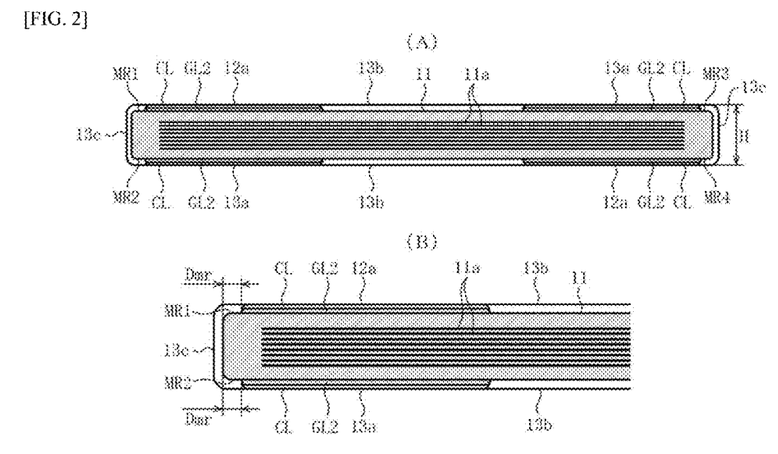
Figure 3:
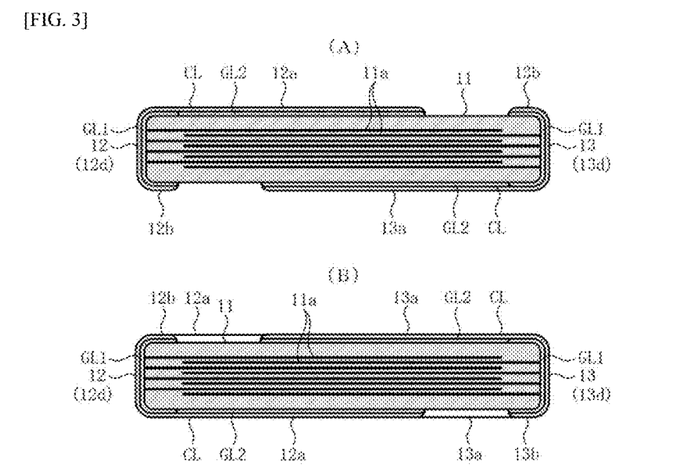

First, the structure of a multilayer capacitor to which the present invention has been applied is explained using FIGS. 1 to 3.

This multilayer capacitor is constituted by a component body 11 of multilayer structure that forms a roughly rectangular solid shape specified in terms of length, width, and height, and also by a first external electrode 12 and a second external electrode 13, each having a different polarity when in use, provided on such component body, where the multilayer capacitor as a whole satisfies the condition of "width W>length L>height H." It should be noted that FIG. 1 (B) shows the multilayer capacitor shown in FIG. 1 (A), which has been rotated by 180 degrees around the line passing through the length-direction center. Also, the width W, length L, and height H of the multilayer capacitor shown in FIGS. 1 to 3 are 1000 μm, 500 μm, and 100 μm (all are reference dimensions without tolerance), for example.

The capacitor body 11 satisfies the condition of "width>length>height" just like the multilayer capacitor does, and has a total of eight corners (first corner C1 to eighth corner C8). Here, the bottom left corner on the one height-direction face of the capacitor body 11 is referred to as "first corner C1," the bottom right corner is referred to as "second corner C2," the top right corner is referred to as "fourth corner C4," and the top left corner is referred to as "fifth corner C5," as shown in FIG. 1 (A), while the bottom left corner on the other height-direction face of the capacitor body 11 is referred to as "sixth corner C6," the bottom right corner is referred to as "eighth corner C8," the top right corner is referred to as "third corner C3," and the top left corner is referred to as "seventh corner C7," as shown in FIG. 1 (B).

Also, in the capacitor body 11, multiple internal electrode layers 11a (eight layers are shown in FIGS. 2 and 3 as a matter of convenience) are positioned with spacing in between in the height direction and being staggered in the length direction. Each internal electrode layer 11a forms a roughly rectangular shape specified in terms of length and width, and the length and width of each layer are smaller than the length and width of the capacitor body 11 and also satisfy the condition of "width>length." An odd-numbered internal electrode layer 11a counted from the one height-direction face has its one length-direction edge (bottom edge in FIG. 1 (A)) connected electrically to the first external electrode 12, while an even-numbered internal electrode layer 11a counted from the one height-direction face has its other length-direction edge (top edge in FIG. 1 (A)) connected electrically to the second external electrode 13.

For the capacitor body 11, preferably a dielectric ceramic whose primary component is barium titanate, strontium titanate, calcium titanate, magnesium titanate, calcium zirconate, calcium zirconate titanate, barium zirconate, titanium oxide, etc., or more preferably a dielectric ceramic of ∈>1000 or Class 2 (high dielectric constant type) is used. Also, for each of the internal electrode layers 11a, preferably a good conductor whose primary component is nickel, copper, palladium, platinum, silver, gold, or any alloy thereof, etc., is used.

The first external electrode 12 has two main electrode parts 12a of roughly rectangular shape, positioned near the first corner C1 on the one height-direction face and near the third corner C3 on the other height-direction face, of the capacitor body 11, respectively, as well as an area (not accompanied by symbol) continuing from the two main electrode parts 12a to achieve electrical continuity between them, formed in a manner covering one length-direction end (bottom end in FIG. 1 (A)) of the capacitor body 11. This area is a continuum comprising two first wraparound parts 12b of roughly rectangular shape that exist at and along one length-direction ends of both height-direction faces of the capacitor body 11, two second wraparound parts 12c of roughly rectangular shape that exist at and along one length-direction ends of both width-direction faces of the capacitor body 11, and one end face part 12d of roughly rectangular shape that exists on one length-direction face (bottom face in FIG. 1 (A)) of the capacitor body 11.

The sum of the maximum length of each main electrode part 12a and the length of the first wraparound part 12b (including the thickness of the end face part 12d) is greater than one-half the length L of the multilayer capacitor. Also, preferably the minimum spacing between each main electrode part 12a and the first wraparound part 13b described later is set in a range of 25 to 200 μm when, for example, the length L of the multilayer capacitor is 500 μm (reference dimension without tolerance). Furthermore, preferably the length of the first wraparound part 12b, and the length of the second wraparound part 12c, are set in a range of 1 to 175 μm when, for example, the length L of the multilayer capacitor is 500 μm (reference dimension without tolerance).

In addition, a first margin area MR1 of roughly belt shape exists between the main electrode part 12a on the one height-direction face of the capacitor body 11 and the edge connecting the first corner C1 and fifth corner C5 on the one height-direction face, while a fourth margin area MR4 of roughly belt shape exists between the main electrode part 12a on the other height-direction face of the capacitor body 11 and the edge connecting the third corner C3 and eighth corner C8 on the other height-direction face. The separation dimensions Dmr (refer to FIG. 2 (B)) of these margin areas MR1, MR4 are equivalent, and preferably set in a range of 1 to 250 μm when, for example, the height H of the multilayer capacitor is 100 μm(reference dimension without tolerance).

As is evident from FIGS. 2 and 3, the first external electrode 12 has a two-layer structure consisting of a continuous layer comprising a first base layer GL1 and a second base layer GL2, and a conductor layer CL covering the surface of the continuous layer. For the first base layer GL1, second base layer GL2, and conductor layer CL, preferably a good conductor whose primary component is nickel, copper, palladium, platinum, silver, gold, titanium, tin, zinc, or any alloy thereof, etc., is used. The primary component of the first base layer GL1, primary component of the second base layer GL2, and primary component of the conductor layer CL, may be different or the same. Incidentally, the method for producing the first external electrode 12 will be described in detail later.

On the other hand, the second external electrode 13 has two main electrode parts 13a of roughly rectangular shape, positioned near the fourth corner C4 on the one height-direction face and near the sixth corner C6 on the other height-direction face, of the capacitor body 11, respectively, as well as an area (not accompanied by symbol) continuing from the two main electrode parts 13a to achieve electrical continuity between them, formed in a manner covering the other length-direction end (top end in FIG. 1 (A)) of the capacitor body 11. This area is a continuum comprising two first wraparound parts 13b of roughly rectangular shape that exist at and along the other length-direction ends of both height-direction faces of the capacitor body 11, two second wraparound parts 13c of roughly rectangular shape that exist at and along the other length-direction ends of both width-direction faces of the capacitor body 11, and one end face part 13d of roughly rectangular shape that exists on the other length-direction face (top face in FIG. 1 (A)) of the capacitor body 11.

The sum of the maximum length of each main electrode part 13a and the length of the first wraparound part 13b (including the thickness of the end face part 13d) is greater than one-half the length L of the multilayer capacitor. Also, preferably the minimum spacing between each main electrode part 13a and the first wraparound part 12b described earlier is set in a range of 25 to 200 μm when, for example, the length L of the multilayer capacitor is 500 μm (reference dimension without tolerance). Furthermore, preferably the length of the first wraparound part 13b, and the length of the second wraparound part 13c, are set in a range of 1 to 175 μm when, for example, the length L of the multilayer capacitor is 500 μm (reference dimension without tolerance).

In addition, a third margin area MR3 of roughly belt shape exists between the main electrode part 13a on the one height-direction face of the capacitor body 11 and the edge connecting the second corner C2 and fourth corner C4 on the one height-direction face, while a second margin area MR2 of roughly belt shape exists between the main electrode part 13a on the other height-direction face of the capacitor body 11 and the edge connecting the sixth corner C6 and seventh corner C7 on the other height-direction face. The separation dimensions Dmr (refer to FIG. 2 (B)) of these margin areas MR3, MR2 are equivalent to the separation dimensions Dmr of the margin areas MR1, MR4, and preferably set in a range of 1 to 250 μm when, for example, the height H of the multilayer capacitor is 100 μm (reference dimension without tolerance).

As is evident from FIGS. 2 and 3, the second external electrode 13 has a two-layer structure consisting of a continuous layer comprising a first base layer GL1 and a second base layer GL2, and a conductor layer CL covering the surface of the continuous layer, just like the first external electrode 12. For the first base layer GL1, second base layer GL2, and conductor layer CL, preferably a good conductor whose primary component is nickel, copper, palladium, platinum, silver, gold, titanium, tin, zinc, or any alloy thereof, etc., is used. The primary component of the first base layer GL1, primary component of the second base layer GL2, and primary component of the conductor layer CL, may be different or the same. Incidentally, the method for producing the second external electrode 13 will be described in detail later.

Figure 5:
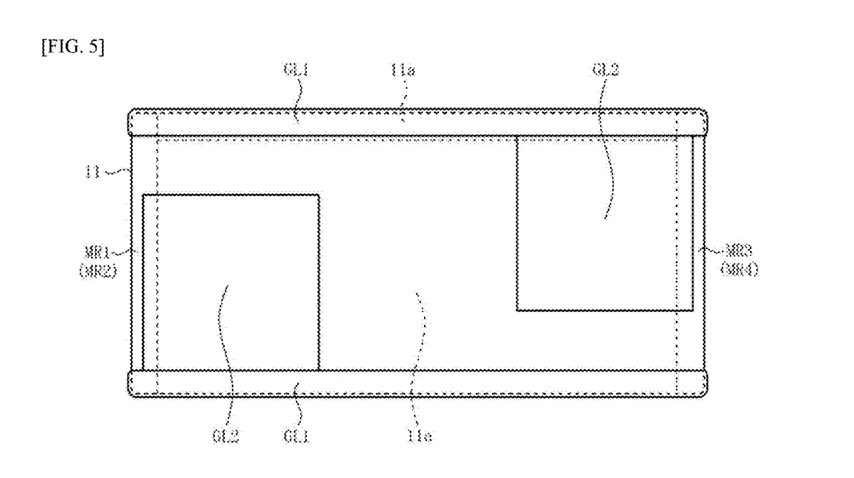
FIG. 5 is a drawing provided to explain the method for producing the first external electrode and second external electrode shown in FIG. 1.
Figure 6:
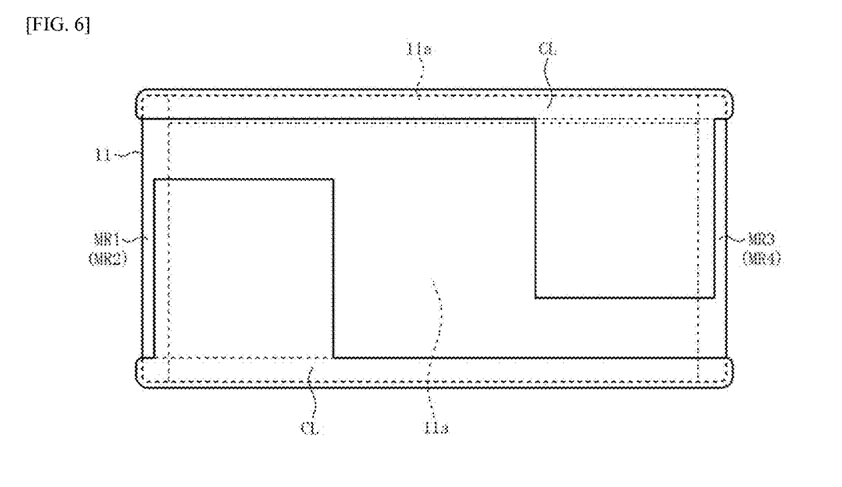
FIG. 6 is a drawing provided to explain the method for producing the first external electrode and second external electrode shown in FIG. 1.

Now, the method for producing the first external electrode 12 and second external electrode 13 is explained using FIGS. 5 and 6.

For production, the capacitor body 11 described earlier is prepared, along with a metal paste that contains at least metal powder, solvent, and binder. Then, as shown in FIG. 5, the metal paste is applied to both length-direction ends of the capacitor body 11 and then dried using a dip coater, roller coater or other coating apparatus, and a drying apparatus, after which the metal paste is printed on both height-direction faces of the capacitor body 11 in shapes corresponding to the main electrode parts 12a, 13a and then dried using a screen printer, gravure printer or other printing apparatus, and a drying apparatus, and subsequently the applied material is baked in an ambience appropriate for the metal powder to form a layer comprising a first base layer GL1 continuing with a second base layer GL2. Preferably the thickness of the first base layer GL1 and that of the second base layer GL2 are set to equivalent values in a range of 0.1 to 10 μm.

Then, as shown in FIG. 6, a conductor film CL is formed on the surface of the continuous layer comprising the first base layer GL1 and second base layer GL2, in a manner covering this surface, using an electroplating apparatus, sputtering apparatus, vacuum deposition apparatus, or other thin film forming apparatus. Preferably the thickness of the conductor film CL is set in a range of 0.1 to 5 μm. By adopting this production method, no marked height difference or undulation will manifest along the boundary of the first base layer GL1 and the second base layer GL2, while the areas of the conductor film CL corresponding to the main electrode parts 12a, 13a will become roughly flat.

Figure 4:
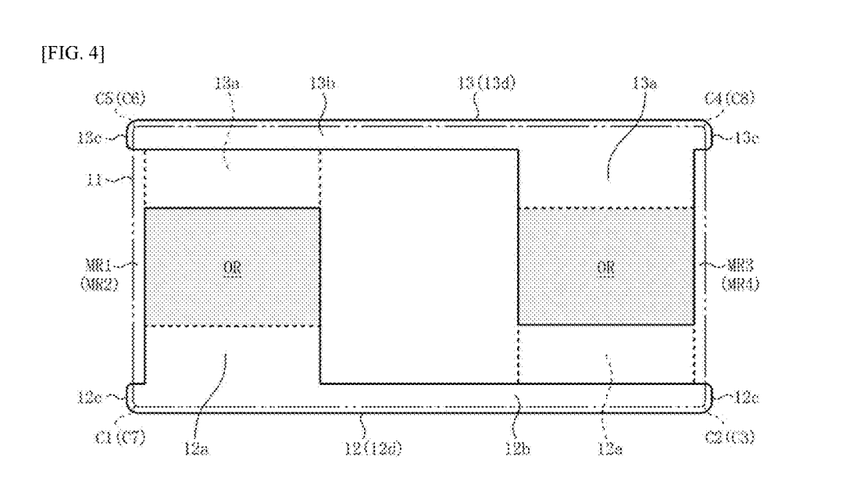
FIG. 4 is a drawing provided to explain the positional relationship of the first external electrode and second external electrode shown in FIG. 1.

Next, the position relationship between the first external electrode 12 and the second external electrode 13, as well as the effects achieved by a multilayer capacitor adopting the first external electrode 12 and the second external electrode 13, are described in detail using FIG. 4. FIG. 4 is a view of a multilayer capacitor from the one height-direction face of its capacitor body, just like FIG. 1 (A), except that the capacitor body 11 is outlined using an imaginary line and that the internal electrode layers 11a are omitted.

(1) As is evident from FIG. 4, the one main electrode part 12a of the first external electrode 12 is positioned near the first corner C1 on the one height-direction face of the capacitor body 11, while the other main electrode part 12a is positioned near the third corner C3 on the other height-direction face which in turn is positioned on the reverse side of the second corner C2 located next, in the width direction, to the first corner C1 on the one height-direction face, where the two main electrode parts 12a are electrically continuous with each other through the first wraparound parts 12b, second wraparound parts 12c and end face part 12d.

Also, as is evident from FIG. 4, the one main electrode part 13a of the second external electrode 13 is positioned near the fourth corner C4 that faces the first corner C1 on the one height-direction face of the capacitor body 11, while the other main electrode part 13a is positioned near the sixth corner C6 on the other height-direction face which in turn is positioned on the reverse side of the fifth corner C5 located next, in the width direction, to the fourth corner C4 on the one height-direction face, where the two main electrode parts 13a are electrically continuous with each other through the first wraparound parts 13b, second wraparound parts 13c, and end face part 13d.

This means that, even when the multilayer capacitor shown in FIG. 4 is rotated by 180 degrees around the line passing through the length-direction center (refer to FIG. 1 (B)), the position relationships of the total four main electrode parts 12a, 13a will not change so long as the first external electrode 12 and the second external electrode 13 are interchangeable with each other. Also, when the multilayer capacitor is rotated by 180 degrees around the line passing through the width-direction center, the total four main electrode parts 12a, 13a will have the same position relationships shown in FIG. 4. In other words, since the polarity of the first external electrode 12, and that of the second external electrode 13, of the multilayer capacitor are determined at the time of use, conductor pads and conductor vias can be connected in the same manner to the main electrode parts 12a, 13a on the one height-direction face or the other height-direction face, regardless of the orientations of both height-direction faces of the component body 11.

In a nutshell, there is no need to control the height-direction orientation of the multilayer capacitor when it is used on a component mounting board, component-incorporating board, etc., and this eliminates the man-hours that would otherwise be required when this orientation must be controlled and thus helps reduce cost.

(2) Both the sum of the maximum length of the two main electrode parts 12a of the first external electrode 12 and the length of the first wraparound part 12b (including the thickness of the end face part 12d), and the sum of the maximum length of the two main electrode parts 13a of the second external electrode 13 and the length of the first wraparound part 13b (including the thickness of the end face part 13d), are greater than one-half the length L of the multilayer capacitor. Accordingly, the one main electrode part 12a of the first external electrode 12 present on the one height-direction face of the capacitor body 11 is partially opposed to the other main electrode part 13a of the second external electrode 13 present on the other height-direction face of the capacitor body 11 (refer to the opposing area OR shown on the left side of FIG. 4), while the one main electrode part 13a of the second external electrode 13 present on the one height-direction face of the capacitor body 11 is partially opposed to the other main electrode part 12a of the first external electrode 12 present on the other height-direction face of the capacitor body 11 (refer to the opposing area OR shown on the right side of FIG. 4).

Additionally, a first margin area MR1 of roughly belt shape exists between the opposing area OR of the one main electrode part 12a of the first external electrode 12 present on the one height-direction face of the capacitor body 11 and the edge connecting the first corner C1 and fifth corner C5 on the one height-direction face, while a second margin area MR2 of roughly belt shape exists between the opposing area OR of the other main electrode part 13a of the second external electrode 13 present on the other height-direction face of the capacitor body 11 and the edge connecting the sixth corner C6 and seventh corner C7 on the other height-direction face. Similarly, a third margin area MR3 of roughly belt shape exists between the opposing area OR of the one main electrode part 13a of the second external electrode 13 present on the one height-direction face of the capacitor body 11 and the edge connecting the second corner C2 and fourth corner C4 on the one height-direction face, while a fourth margin area MR4 of roughly belt shape exists between the opposing area OR of the other main electrode part 12a of the first external electrode 12 present on the other height-direction face of the capacitor body 11 and the edge connecting the third corner C3 and eighth corner C8 on the other height-direction face.

In essence, the shortest distance between the opposing area OR of the one main electrode part 12a of the first external electrode 12 and the opposing area OR of the other main electrode part 13a of the second external electrode 13 is the sum of the height of the capacitor body 11, separation dimension Dmr of the first margin area MR1, and separation dimension Dmr of the second margin area MR2. Similarly, the shortest distance between the opposing area OR of the one main electrode part 13a of the second external electrode 13 and the opposing area OR of the other main electrode part 12a of the first external electrode 12 is the sum of the height of the capacitor body 11, separation dimension Dmr of the third margin area MR3, and separation dimension Dmr of the fourth margin area MR4. In other words, the two shortest distances are not each constituted by only the length of a line along the height of the capacitor body 11; instead, they are each constituted by the sum of the length of a line along the height of the capacitor body 11 and the lengths of two lines along the width of the capacitor body 11.

Accordingly, even when the height of the capacitor body 11 is decreased as a result of size reduction or thickness reduction, and the main electrode parts 12a, 13a on the one height-direction face or the other height-direction face of the capacitor body 11 are mounted, using solder, on conductor pads on a component mounting board, component-incorporating board, etc., bridges that could create electrical continuity between the opposing areas OR of the main electrode parts 12a and the opposing areas OR of the main electrode parts 13a will not easily generate due to scattering or wetting of solder when the capacitor is mounted, etc., and shorting of the first external electrode 12 and the second external electrode 13 can be prevented as a result. Additionally, even when the height of the capacitor body 11 is decreased as a result of size reduction or thickness reduction and the multilayer capacitor is incorporated in a component-incorporating board in such a way that conductor vias are connected to the main electrode parts 12a, 13a on the one height-direction face or the other height-direction face of the capacitor body 11, electrical continuity is unlikely to occur, after the capacitor has been incorporated, between the opposing areas OR of the main electrode parts 12a and the opposing areas OR of the main electrode parts 13a due to migration products attributable to moisture in the component sealing resin, and shorting of the first external electrode 12 and the second external electrode 13 can be prevented as a result.

(3) As discussed earlier, the separation dimension Dmr of the first margin area MR1, separation dimension Dmr of the second margin area MR2, separation dimension Dmr of the third margin area MR3, and separation dimension Dmr of the fourth margin area MR4, are all equivalent. This means that, even when the multilayer capacitor is used in different height-direction orientations on a component mounting board, component-incorporating board, etc., the effects discussed in the second half of (2) above can be achieved without fail.

(4) As discussed earlier, the capacitor body 11 of the multilayer capacitor satisfies the condition of "width>length>height," and an area to achieve electrical continuity between the one main electrode part 12a and the other main electrode part 12a of the first external electrode 12 (continuum comprising first wraparound parts 12b, second wraparound parts 12c, and end face part 12d) is formed in a manner covering the one length-direction end of the capacitor body 11, while an area to achieve electrical continuity between the one main electrode part 13a and the other main electrode part 13a of the second external electrode 13 (continuum comprising first wraparound parts 13b, second wraparound parts 13c, and end face part 13d) is formed in a manner covering the other length-direction end of the capacitor body 11. This means that, even when the capacitor body 11 satisfies the condition of "width>length>height," the strength at the one length-direction end and the other length-direction end of the capacitor body 11 can be improved without fail by means of each of the aforementioned areas, and this also helps improve characteristics such as achieving lower ESL.

It should be noted that, in the aforementioned embodiment, the first external electrode 12 has two main electrode parts 12a of roughly rectangular shape, and the second external electrode 13 has two main electrode parts 13a of roughly rectangular shape; however, the shape of each main electrode part 12a and that of each main electrode part 13a are not limited in any way. The following introduces several variation examples of the first external electrode 12 and second external electrode 13, where the shape of each of the main electrode parts 12a, and the shape of each of the main electrode parts 13a, respectively, have been changed.

<First Variation Example>

Figure 7:
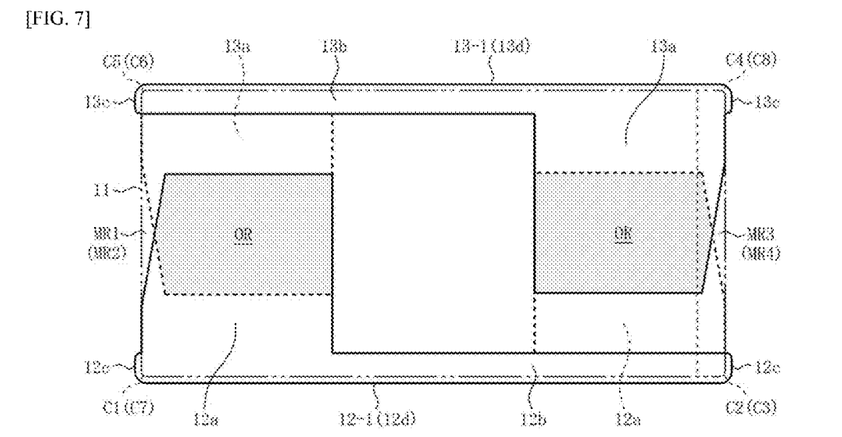
FIG. 7 is a drawing corresponding to FIG. 4, illustrating a first variation example of the first external electrode and second external electrode shown in FIG. 1.

A first external electrode 12-1 and a second external electrode 13-1 shown in FIG. 7 are such that their respective two main electrode parts 12a and two main electrode parts 13a each have a roughly pentagonal shape. In this case, every opposing area OR has a roughly pentagonal shape; however, effects similar to those described in the aforementioned embodiment can still be achieved.

<Second Variation Example>

Figure 8:
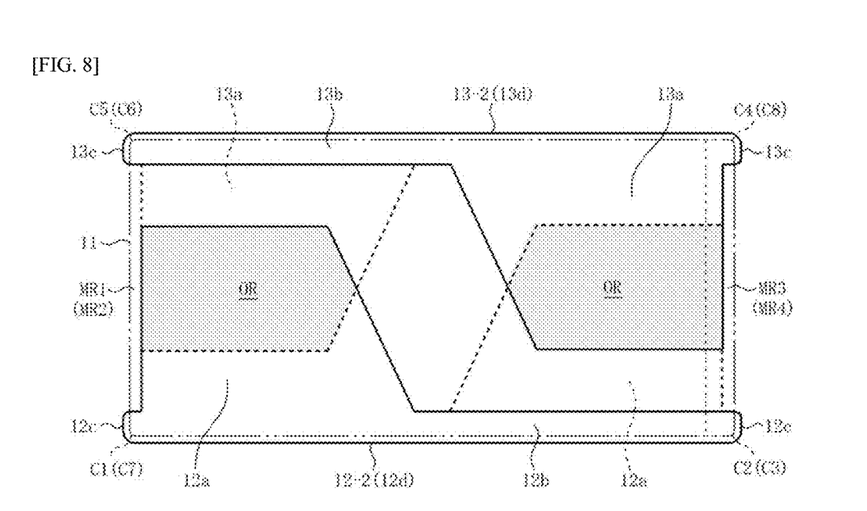
FIG. 8 is a drawing corresponding to FIG. 4, illustrating a second variation example of the first external electrode and second external electrode shown in FIG. 1.

A first external electrode 12-2 and a second external electrode 13-2 shown in FIG. 8 are such that their respective two main electrode parts 12a and two main electrode parts 13a each have a roughly trapezoidal shape. In this case, every opposing area OR has a roughly pentagonal shape; however, effects similar to those described in the aforementioned embodiment can still be achieved.

<Third Variation Example>

Figure 9:
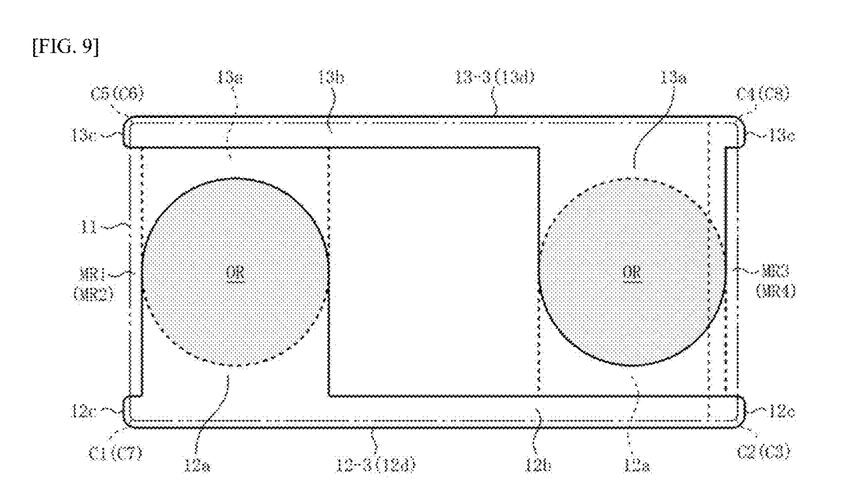
FIG. 9 is a drawing corresponding to FIG. 4, illustrating a third variation example of the first external electrode and second external electrode shown in FIG. 1.

A first external electrode 12-3 and a second external electrode 13-3 shown in FIG. 9 are such that their respective two main electrode parts 12a and two main electrode parts 13a each have a roughly U shape. In this case, every opposing area OR has a roughly circular shape; however, effects similar to those described in the aforementioned embodiment can still be achieved.

<Fourth Variation Example>

Figure 10:
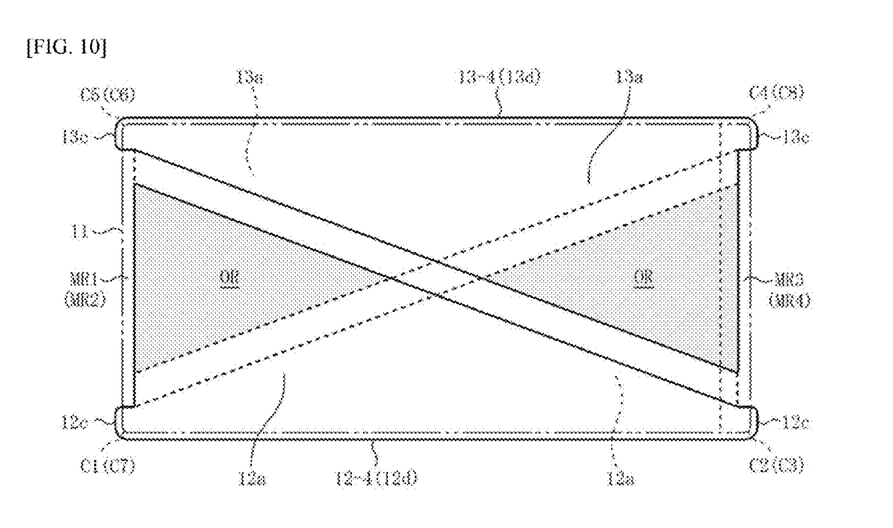
FIG. 10 is a drawing corresponding to FIG. 4, illustrating a fourth variation example of the first external electrode and second external electrode shown in FIG. 1.

A first external electrode 12-4 and a second external electrode 13-4 shown in FIG. 10 are such that their respective two main electrode parts 12a and two main electrode parts 13a each have a roughly triangular shape. In this case, every opposing area OR has a roughly triangular shape; however, effects similar to those described in the aforementioned embodiment can still be achieved.

Additionally, the first external electrode 12 and second external electrode 13 have a two-layer structure in the aforementioned embodiment and each variation example; however, they may have a three-layer structure by forming one other conductor layer on the surface of the conductor layer SL1, or a four-layer structure by forming two other conductor layers on the surface of the conductor layer SL1.

Furthermore, the present invention was applied to a multilayer capacitor in the aforementioned embodiment and each variation example; however, effects similar to the above can still be achieved when the present invention is applied to a multilayer inductor, multilayer varistor, or other multilayer electronic component.

DESCRIPTION OF THE SYMBOLS

11—Capacitor body, C1 to C8—First corner to eighth corner, 11a—Internal electrode layer, 12, 12-1, 12-2, 12-3, 12-4—First external electrode, 12a—Main electrode part, 12b—First wraparound part, 12c—Second wraparound part, 12d—End face part, 13, 13-1, 13-2, 13-3, 13-4—Second external electrode, 13a—Main electrode part, 13b—First wraparound part, 13c—Second wraparound part, 13d—End face part, MR1 to MR4—First margin area to fourth margin area, Dmr—Separation dimension, GL1—First base layer, GL2—Second base layer, CL—Conductor layer.

What is claimed is:

1. A multilayer electronic component constituted by a component body of multilayer structure that forms a roughly rectangular solid shape specified in terms of length, width, and height, and also by a first external electrode and a second external electrode, each having a different polarity when in use, provided on the component body, said length being a dimension along an extending direction of layers of the multilayer structure toward the first or second external electrode, said height being a dimension along a layer-stacking direction, said width being a dimension along a direction orthogonal to the length direction and the height direction, wherein: (1) the first external electrode has two main electrode parts that are electrically continuous with each other, where one main electrode part is positioned near a first corner on one height-direction face of the component body, and another main electrode part is positioned on another height-direction face near a third corner which is positioned on a reverse side of a second corner next to the first corner along the first external electrode on the one height-direction face of the component body; (2) the second external electrode has two main electrode parts that are electrically continuous with each other, where one main electrode part is positioned on the one height-direction face near a fourth corner which is diagonal to the first corner across the one height-direction face of the component body, and another main electrode part is positioned on the other height-direction face near a sixth corner which is positioned on a reverse side of a fifth corner next to the fourth corner along the second external electrode on the one height-direction face of the component body; (3) the one main electrode part of the first external electrode present on the one height-direction face of the component body is positionally partially opposed, via the component body in the height direction, to the other main electrode part of the second external electrode present on the other height-direction face of the component body, where a first margin area exists between an opposing area of the one main electrode part of the first external electrode and an edge connecting the first corner with the fifth corner, and a second margin area exists between an opposing area of the other main electrode part of the second external electrode and an edge connecting the sixth corner with a seventh corner on the other height-direction face positioned on a reverse side of the first corner; (4) the one main electrode part of the second external electrode present on the one height-direction face of the component body is positionally partially opposed, via the component body in the height direction, to the other main electrode part of the first external electrode present on the other height-direction face of the component body, where a third margin area exists between an opposing area of the one main electrode part of the second external electrode and an edge connecting the second corner with the fourth corner, and a fourth margin area exists between an opposing area of the other main electrode part of the first external electrode and an edge connecting the third corner with an eighth corner on the other height-direction face positioned on a reverse side of the fourth corner; (5) the first external electrode has an end face part of roughly rectangular shape that exists on one length-direction face of the component body and connects the two main electrode parts of the first external electrode; (6) the second external electrode has an end face part of roughly rectangular shape that exists on another length-direction face of the component body and connects the two main electrode parts of the second external electrode; (7) the first external electrode has two wraparound parts of roughly rectangular shape that exist at and along one length-direction ends of both width-direction faces of the component body and extend from the end face part of the first external electrode; and (8) the second external electrode has two wraparound parts of roughly rectangular shape that exist at and along another length-direction ends of both width-direction faces of the component body and extend from the end face part of the second external electrode.

2. A multilayer electronic component according to claim 1, wherein the first margin area, second margin area, third margin area, and fourth margin area, each have an equivalent separation dimension.

3. A multilayer electronic component according to claim 2, wherein: the component body satisfies a condition of "width>length>height"; an area to achieve electrical continuity between the one main electrode part and the other main electrode part of the first external electrode is formed in a manner covering one length-direction end face of the capacitor body; and an area to achieve electrical continuity between the one main electrode part and the other main electrode part of the second external electrode is formed in a manner covering another length-direction end face of the capacitor body.

4. A multilayer electronic component according to claim 1, wherein: the component body satisfies a condition of "width>length>height"; an area to achieve electrical continuity between the one main electrode part and the other main electrode part of the first external electrode is formed in a manner covering one length-direction end face of the capacitor body; and an area to achieve electrical continuity between the one main electrode part and the other main electrode part of the second external electrode is formed in a manner covering another length-direction end face of the capacitor body.

* * * * *